United States Patent [19]

Helava et al.

[11] 4,166,440
[45] Sep. 4, 1979

[54] ENGINE CONTROL SYSTEM UTILIZING TORQUE CONVERTER SLIP

[75] Inventors: Uuno V. Helava, Hanover, Fed. Rep. of Germany; Jack R. Phipps, St. Claire Shores, Mich.

[73] Assignee: The Bendix Corporation, Southfield, Mich.

[21] Appl. No.: 837,782

[22] Filed: Sep. 29, 1977

[51] Int. Cl.² .............................................. F02P 5/14
[52] U.S. Cl. ........................... 123/117 R; 123/117 D; 123/32 EB; 73/118; 74/857
[58] Field of Search ....... 123/117 D, 117 R, 146.5 A, 123/119 EC, 32 EA, 32 EB; 73/118; 60/355, 356, 361, 362; 74/857

[56] References Cited

U.S. PATENT DOCUMENTS

| | | | |
|---|---|---|---|
| 2,842,108 | 7/1958 | Sanders | 123/32 EA |
| 3,521,611 | 7/1970 | Finch | 123/117 R |
| 3,680,370 | 8/1972 | Muller-Berner | 73/118 |
| 3,738,193 | 6/1973 | Sumiyoshi et al. | 74/866 |
| 3,897,766 | 8/1975 | Pratt, Jr. et al. | 123/117 D |
| 3,935,846 | 2/1976 | Zelenka | 123/117 D |
| 3,976,043 | 8/1976 | Canup et al. | 123/117 D |
| 4,003,354 | 1/1977 | Canup | 123/117 R |
| 4,098,244 | 7/1978 | Sumiyoshi et al. | 123/117 R |

Primary Examiner—Charles J. Myhre
Assistant Examiner—Andrew M. Dolinar
Attorney, Agent, or Firm—Gaylord P. Haas, Jr.; Russel C. Wells

[57] ABSTRACT

An engine control system is disclosed wherein torque or slip speed of a fluid coupling or torque converter is used for the control of an engine operating parameter, such as ignition spark advance. In the fluid coupling or torque converter, the respective speeds of the impeller and turbine are sensed by sensors which respond to the passing of each blade of the respective impeller and turbine. The speed signals are applied to computing means to produce a control signal corresponding to either slip speed or engine output torque, as desired, according to a predetermined functional relationship of the speed signals. The control signal is applied to control means which is operative to adjust a selected engine operating parameter. In a particular embodiment, the control means includes detecting means for determining changes in the value of the control signal and also includes a controller for the ignition spark advance which advances or retards the ignition in order to optimize the engine output torque.

10 Claims, 5 Drawing Figures

ENGINE CONTROL SYSTEM UTILIZING TORQUE CONVERTER SLIP

FIELD OF THE INVENTION

This invention relates to engine control systems especially adapted for automotive vehicles. More particularly, it relates to an engine control system in which the slip of a fluid coupling or torque converter is used for controlling an engine operating parameter.

BACKGROUND OF THE INVENTION

There is a continuing need to improve the performace of automotive engines, especially in respect to fuel economy and emissions. For this purpose, many types of engine control systems have been devised including closed loop control systems in which an adjustment of an engine control variable is made in response to measurement of a controlled variable which is selected as an index of one aspect of engine performance. It is desirable to effect control of the engine according to a controlled variable which provides a reliable measure of engine performance, especially in respect to the desired performance goal such as fuel economy, emissions, or the like. It is well known that one of the most important indices of engine performance is the value of engine output torque. This invention provides an engine control system which utilizes a control signal representative of the actual instantaneous value of engine output torque for the control of a selected engine operating parameter.

THE PRIOR ART

In known engine control systems it is common practice to utilize intake manifold vacuum as a control variable as being representative of torque. Intake vacuum is used, for example, for control of ignition spark advance and for control of the shift point in automatic transmissions. However, intake vacuum varies with throttle position, engine speed and other quantities; at best, intake vacuum is a rough approximation of engine output torque under steady state conditions. The engine intake vacuum signal is more properly characterized as a torque demand signal instead of an engine output torque signal.

In the prior art, it is known to use a signal corresponding engine output torque for controlling the load on the engine. The Nick U.S. Pat. No. 3,890,832 discloses a system wherein an engine output torque signal is computed as a function of horsepower and speed and when the signal reaches a given set point an adjustment in the driven load is made. In the Bysarovich U.S. Pat. No. 3,444,730, the mean effective pressure acting on an engine piston during a power cycle is measured as an indication of engine torque.

It is known in the prior art that the slip of a fluid coupling or torque converter is a function of the engine output torque. This functional relationship is described in "Torque Converters or Transmissions" Heldt, Chilten Company, 5th Ed., 1955, pages 80-81. Various devices have been proposed for detecting slip in fluid couplings or torque converters. The Hautzenroeder U.S. Pat. No. 2,975,633 discloses a device which detects fluid coupling slip by comparing engine speed with engine manifold vacuum. When the manifold vacuum drops below an empirically determined value for a given speed, excessive slip is indicated and the operator is warned to adjust the operating conditions. The Muller-Berner U.S. Pat. No. 3,680,370 discloses a mechanical device for comparing the speeds of the input and output shafts of a torque converter to provide a warning signal when the speed difference exceeds a given value for a period of time.

SUMMARY OF THE INVENTION

In accordance with this invention, an engine control system is provided for an automotive vehicle having a fluid coupling, such as a torque converter, driven by the engine and wherein the control system uses a signal which varies with slip in the fluid coupling. The slip signal is indicative of engine output torque and is used for changing or controlling the value of a selected engine operating parameter. (As used herein, the term fluid coupling is a generic term meaning impeller-turbine type hydraulic power transmitting devices; a torque converter is a species which provides variable torque ratio.)

Further, according to the invention, measuring means are coupled to the fluid coupling to develop a slip or torque signal. Such measuring means comprises first and second transducer means coupled with the impeller and turbine respectively for measuring the respective speeds and computing means for producing the control signal as a predetermined function of the difference between the respective speeds.

Further, according to the invention, the control signal is used in a closed loop control system wherein the selected engine operating parameter, such as ignition spark advance, influences the value of engine output torque. The control means includes detecting means for producing an increment signal having a magnitude and sign corresponding to changes in the control signal and a controller which responds to the increment signal for changing the value of the engine operating parameter to maximize the output torque.

Further, according to the invention, the transducer means for developing the impeller or turbine speed signal comprises a sensor element mounted on a stationary member of the fluid coupling adjacent the blades of the impeller or turbine, as the case may be, for producing an electrical pulse in response to the passing of each vane. The sensor comprises a sensing element responsive to a change of wave energy induced by the motion of the adjacent vane.

Further, according to the invention, the measuring means for the fluid coupling slip or torque value is implemented in digital logic circuitry and comprises pulse counting means and computing means for developing the control signal. The control means is also implemented in the form of digital logic.

DETAILED DESCRIPTION

A more complete understanding of this invention may be obtained from the detailed description that follows, taken with the accompanying drawings in which.

Figure 1:
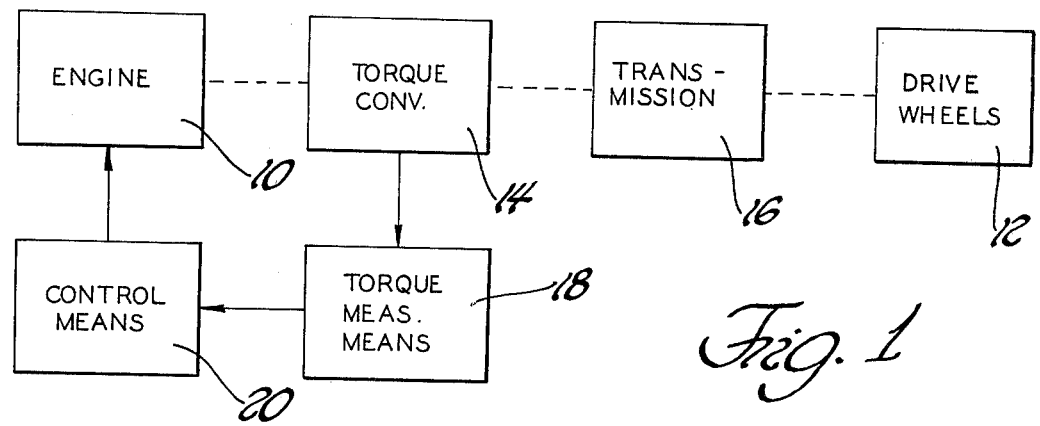
FIG. 1 is a block diagram of the control system of this invention.

Referring now to the drawings, an illustrative embodiment of the invention will be described wherein a signal corresponding to torque converter slip is used in a particular control system configuration, i.e. in a closed loop or feedback arrangement. In this type of control system the control signal which is indicative of engine output torque is used to adjust a controlled variable (engine operating parameter) in such a manner that the output torque is maximized. It will be appreciated as the description proceeds that the invention may also be embodied in other control system configurations, such as open loop systems. Additionally, in the illustrative embodiment of the invention the control signal is used to adjust the value of the ignition spark advance of the engine as the selected engine operating parameter. It will also be appreciated that the invention is useful for adjusting other engine operating parameters such as air fuel ratio and EGR.

As shown in FIG. 1, the illustrative embodiment of the control system is utilized in an automotive vehicle. The vehicle comprises an internal combustion engine 10 which has its crankshaft drivingly connected with the vehicle drive wheels 12 through a torque converter 14 and a change speed transmission 16. According to this invention, a slip or torque measuring means 18 is coupled with the torque converter 14 and provides a control signal to a control means 20 which adjusts the ignition spark advance of the engine 10.

Before proceeding with a detailed description of the control system, the torque measurement means 18 will be described with reference to FIGS. 2, 3 and 4. Most automobiles currently are equipped with an automatic transmission which includes a hydrodynamic torque converter. The torque converter 14 is diagrammatically shown in FIG. 2 and comprises three vaned wheels, namely an impeller 22, a turbine 24 and a reactor 26. All of the vaned wheels are enclosed in a housing filled with hydraulic fluid. The impeller 22 is connected with an input shaft 28 which in turn is connected with the engine crankshaft. The turbine 24 is connected with the torque converter output shaft 30 which in turn is connected with the change speed transmission 16. The reactor 26 is nonrotatably mounted on a fixed sleeve 32. The passages between the vanes of the three vaned wheels form a complete circuit for circulation of the hydraulic fluid when the converter is in operation. The rotation of the impeller causes the fluid to circulate in a vortex pattern within the torus formed by the vaned wheels. The turbine is rotated at a lower speed than that of the impeller and the difference between the speeds of the impeller and turbine is known as the slip speed. The slip speed as a percentage of impeller speed is known as slip. The torque ratio of the torque converter is maximum when the turbine is at standstill and the impeller is rotating at high speed as when the vehicle is being started from rest. As the turbine speed increases the torque ratio of the converter decreases automatically, thus providing the desired variable torque ratio which enables the engine to meet varying load conditions.

The value of engine output torque, is a known function of torque converter slip speed. An equation for the value of engine output torque can be derived from the following relationship:

$$N_t = \sqrt{N_i^2 - T_e/K_c} \tag{1}$$

where
$N_t$ = turbine speed
$N_i$ = impeller speed
$T_e$ = engine output torque
$K_c$ = converter torque capacity factor.

To a good approximation, this relationship may be rewritten as follows:

$$N_t = N_i - T_e/2K_cN_i \tag{2}$$

By rearranging terms, the expression for engine output torque is obtained as follows:

$$T_e = (N_i - N_t)2K_cN_i \tag{3}$$

Examination of equation 3 shows that the engine output torque $T_e$, is proportional to the product of the slip speed, $(N_i - N_t)$, and impeller speed, $N_i$, with a constant of proportionality determined by the particular torque converter. It is noteworthy that the value of slip in a torque converter varies monotonically with torque, and accordingly the slip speed can be used directly to optimize the engine torque output.

It is also noted that for a given impeller speed the value of slip speed increases linearly with engine output torque. When the value of slip speed is maximized, the value of engine torque is also maximized for any value of impeller speed. Accordingly, the relationship lends itself to a closed loop control system which controls the engine in such a manner as to optimize the output torque.

For the computation of slip speed and torque, it is necessary to provide signals corresponding to the impeller speed and the turbine speed. For this purpose, stationary sensing means are provided in the torque converter for detecting the passing of the vanes or blades and a time base is provided to produce speed information.

Figure 2:
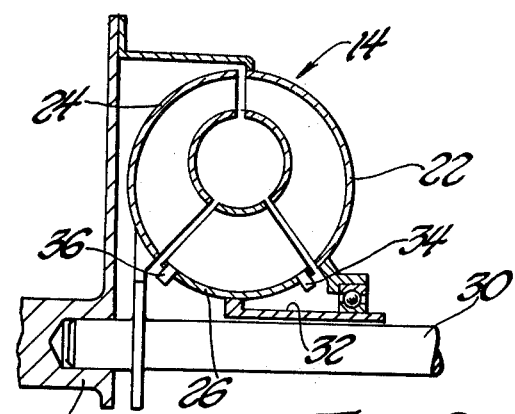
FIG. 2 is a cross-sectional view of a torque converter and shows the placement of sensors according to this invention.

As shown in FIG. 2, a sensor 34 is mounted in the reactor 26 at a position adjacent the vanes of the impeller 22. Similarly, a sensor 36 is mounted on the reactor at a position adjacent the vanes of the turbine 24. The sensors 34 and 36 are suitably identical to each other and are responsive to a change of wave energy produced by the passing of a vane. In the illustrative embodiment, the sensors are electro-acoustical devices which respond to pressure waves in the fluid medium created by the passing vanes. It will be appreciated that other sensing devices may be used; preferably, the sensing device is energy coupled with the moving vanes by a form of wave energy so that an electrical impulse is produced by each passing vane. The term wave energy as used herein is intended to include not only acoustical or pressure waves and electromagnetic waves, but also magnetic field variations. For example, the sensing device may be a magnetic reluctance sensor, an eddy current sensor, or an ultrasonic transmitter-receiver sensor. The preferred embodiment, as illustrated, uses an electro-acoustical sensor.

Figure 3:
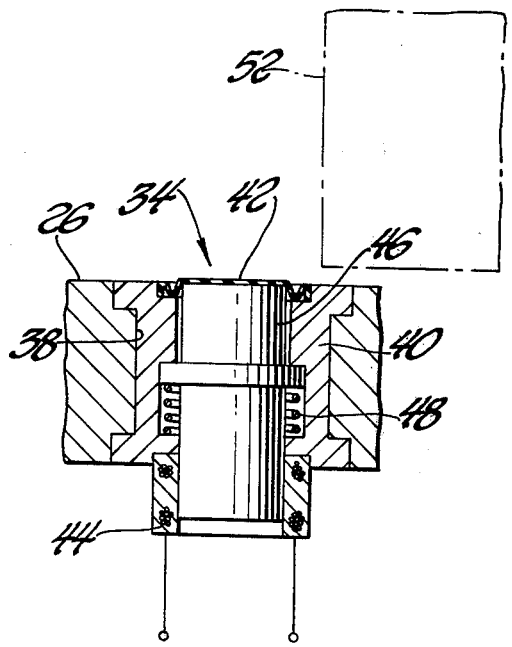
FIG. 3 shows the detail of a sensor.
Figure 4:
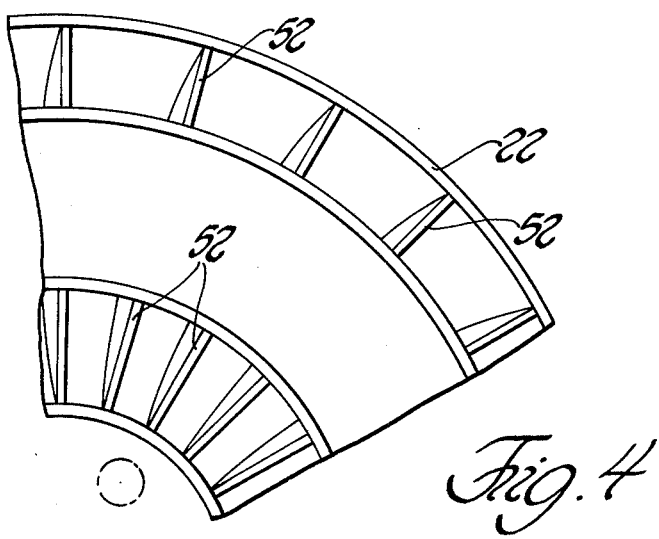
FIG. 4 is an elevation view of part of the impeller showing sensor location.

FIG. 3 shows the details of the sensor 34. This sensor suitably takes the form of a conventional microphone of the fixed coil type. The sensor is mounted in the inner rim or housing 36 of the reactor 26. In particular, a passage 38, circular in cross-section, extends through the housing 36 and receives the sensor 34. The sensor comprises a cylindrical body 40 which is fixedly mounted within the passage 38 and which is provided at its inner end with a diaphragm 42 to provide a fluid seal across the inner end of the body 40. A fixed pick-up coil 44 is disposed on the outer end of the cylindrical body 40 and a moveable core 46 has a portion which extends into the opening of the coil 44. The core 46 is biased away from the coil 44 and toward the diaphragm 42 by a helical spring 48. As shown in FIGS. 3 and 4, the sensor 34 is positioned on the reactor between adjacent reactor vanes and near the ends of the vanes so that it is in close proximity to the ends of vanes 52 on the impeller 22. When the torque converter 14 is running, a fluid pressure wave is generated by each vane of the impeller 22. Accordingly, each vane 52 causes a fluid pressure impulse as it passes sensor 34. This pressure impulse impinges upon the diaphragm 42 and displaces it and the movable core 46 momentarily toward the pick-up coil 44 against the bias of spring 48. The motion of the core 46 relative to the pick-up coil 44 causes a voltage pulse to be induced in the coil 44 which appears at the output terminals of the coil. The sensor 36, as noted above, is of the same construction as the sensor 34. It is mounted in the reactor 26 in the same manner relative to the vanes of the turbine 24.

Figure 5:
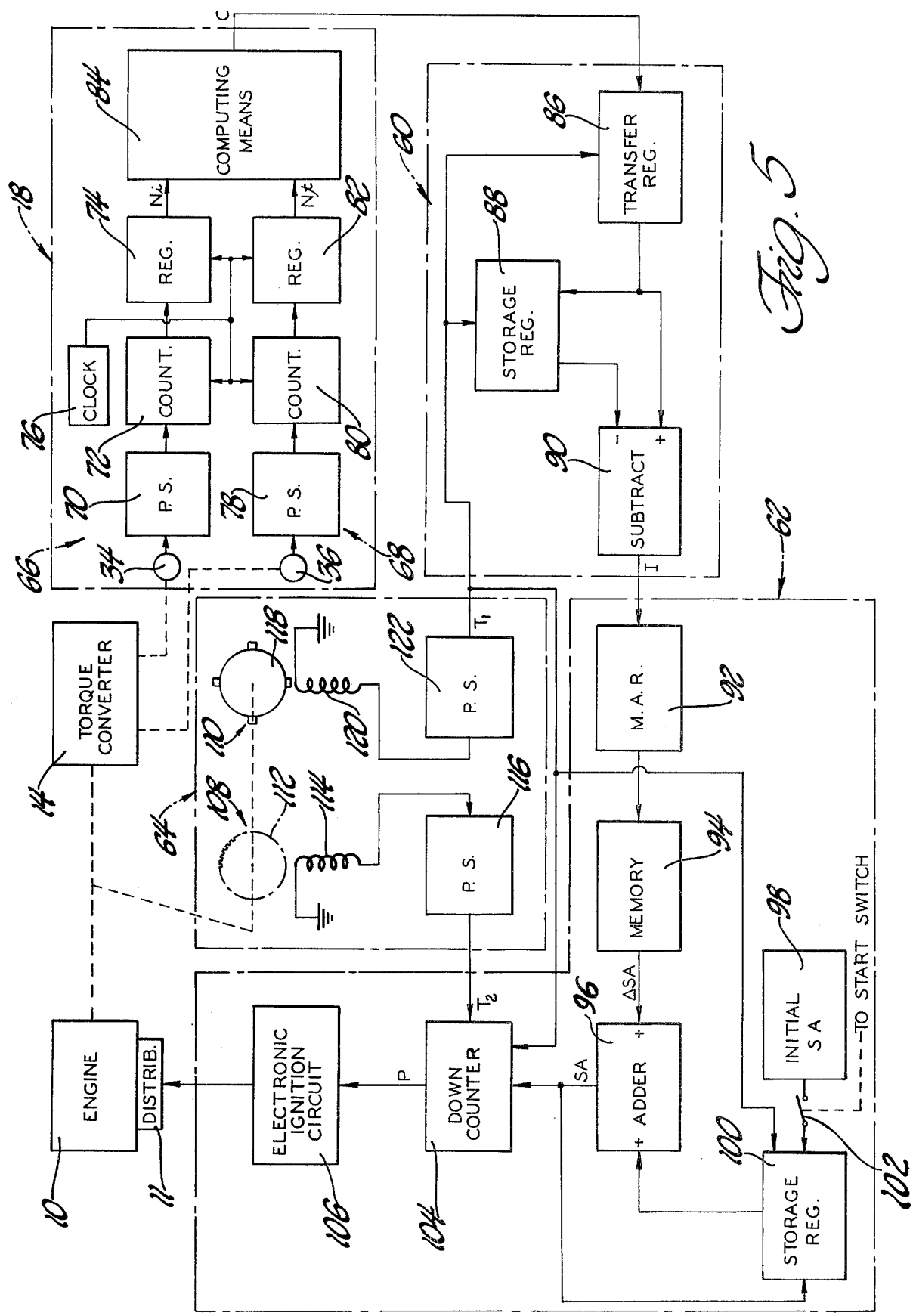
FIG. 5 is a block diagram of the inventive control system.

The engine control system will now be described in detail with reference to FIG. 5. In the illustrative embodiment of FIG. 5, the circuitry is implemented in digital logic. As is well known, different logic schemes and designs may be utilized to achieve a given function. In the illustrative embodiment the logic is of conventional design and the signal and data flow are shown by single line connection diagrams which are used to represent parallel transfer of digital signals and data. It will be appreciated that the control system can be implemented by use of a microprocessor. The control system comprises in general, slip speed measuring means 18 coupled with the torque converter 14 for producing a control signal C which varies in accordance with the slip speed in the torque converter. The control means comprises a detecting means 60 which receives the control signal from the measuring means and produces an increment signal I having a magnitude and sign corresponding to a change in the control signal. The control means includes a controller 62 connected with the detecting means 60 and with the distributor 11 of the engine and is responsive to the increment signal for changing the value of a spark advance signal SA according to said increment signal. A timing means 64 is provided for timing the operation of the detecting means and the controller.

The torque measuring means 18 comprises a first transducer means 66 for developing an impeller speed signal and a second transducer means 68 for developing a turbine speed signal. The transducer means 66 includes the sensor 34 which produces a signal event in the form of a discrete electrical pulse in response to each impeller vane passing thereby. The output of the sensor 34 is applied to a pulse shaping circuit 70 which produces a well defined output pulse corresponding to each sensor pulse. The output pulses from the pulse shaper 70 are applied to the input of a pulse counter 72, the output of which is connected with a register 74. A clock signal generator 76 is connected with a reset input of the counter 72 and with a clear input of the register 74. Each clock pulse causes the register 74 to be cleared and the existing count to be transferred to the register and causes the counter 72 to be reset for counting during the succeeding clock interval. The transducer means 68 comprises the sensor 36, a pulse shaper 78, a counter 80 and a register 82. The clock signal generator 76 is connected with the reset input of the counter 80 and clear input of the register 82 for periodically transferring the count to the register and resetting the counter. The measuring means 18 also includes a computing means 84 connected with the registers 74 and 82. The computing means receives the impeller speed signal $N_i$ and the turbine speed signal $N_t$ at respective inputs and produces the output control signal C which is a predetermined function of the speed signals. In particular, the desired control signal is proportional to slip speed and hence the predetermined function is the difference between the input signals, i.e. $(N_i - N_t)$. Alternatively, the control signal developed by the computing means 84 may be proportional to engine output torque, in which case the predetermined function is given in equation (3) above.

In order to detect changes in the value of the control signal C, the detecting means 60 is provided. The detecting means comprises a transfer register 86 which has an input connected with the output of computing means 84 and continuously receives the control signal C. The output of the transfer register 86 is applied to the input of a storage register 88 and also to the minuend input of a subtractor 90 which has its subtrahend input connected with the output of the storage register 88. The storage register 88 and the transfer register 86 each have clock inputs which are connected with the timing means 64 which produces a timing signal $T_1$ and will be described below. When the clock inputs of the registers 86 and 88 receive a timing pulse, the current value of the control signal C is applied to the minuend input of the subtractor 90 and the previous value of the control signal C is applied from the storage register 88 to the subtrahend input of the subtractor 90. At the same time the current value of the control signal is transferred into the storage register 88. Consequently, upon the occurrence of each pulse of timing signal $T_1$ the output of the subtractor 90 is updated and produces the increment signal I which corresponds in magnitude and sign to the change in the control signal value since the last pulse of the timing signal $T_1$. The increment signal I is utilized by the controller 62 to cause an appropriate change in the ignition spark advance of the engine.

The controller 62 is adapted to retard or advance the occurrence of the ignition spark in the respective engine cylinder according to the magnitude and sign of the change in the control signal, i.e. according to the sign and magnitude of the increment signal. The controller comprises a memory address register 92 which receives and holds the latest value of the increment signal. The output of the memory address register 92 is applied to the input of a memory 94. The memory 94 is preferably a read-only memory which stores data representing the desired degree of change in spark advance corresponding to different values of increment signal, i.e. different values of change in slip or torque. Accordingly, for different values of the increment signal held in the memory address register 92, the memory 94 will produce an output signal $\Delta SA$ representing a particular value of change to be made in the spark advance. The output of the memory 94 is applied to the addend input of an adder 96. In order to preset the initial spark advance value for the engine ignition, a manually presettable, initial spark advance signal generator 98 is provided. The output of the signal generator 98 is connected to an initializing input of a storage register 100 through a momentary start switch 102 which is closed and opened concurrently with the engine start switch. The timing means 64 is connected with a clock input of the register 100 and the output of the register is connected to the augend input of the adder 96. The value held in the storage register 100 is applied to the adder in response to a pulse of the timing signal $T_1$. The output of the adder 96, which is equal to the sum of the two inputs, is applied to the signal input of the storage register 100 and hence the storage register, after initialization, always holds the last value of spark advance. Thus, the output of the adder 96 is updated on the occurrence of each pulse of the timing signal $T_1$ to provide a current spark advance signal SA at the output of the adder. The current value of spark advance is the algebraic sum of the last value of spark advance and the value of the spark advance change $\Delta SA$.

In order to set the spark advance for the engine ignition, the spark advance signal SA from the adder 96 is applied to the preset input of a down-counter 104. The count input of the down-counter 104 receives a timing signal $T_2$ from the timing means 64 which will be described presently. The timing signal $T_2$ is a pulse train in which each pulse represents a predetermined angular increment of rotation of the engine crankshaft. The reset input of the down-counter 104 receives the timing signal $T_1$ and is reset thereby at the start of each counting cycle. The down-counter 104 starts counting down from 360°, corresponding to top dead center of a given piston, and when the counter reaches the preset count equal to the spark advance signal SA the down-counter produces an output pulse P. This output of the down-counter 104 is applied to the input of the electronic ignition circuit 106 causing it to fire instantaneously the spark plug of the given cylinder.

The timing means 64 comprises a pair of shaft angle encoders 108 and 110. The encoder 108 is adapted to produce the timing signal $T_2$ and comprises a toothed wheel 112 and a pick-up coil 114, the wheel 112 being driven at the same speed as the engine crankshaft. The toothed wheel 112 suitably has 360 equally spaced teeth so that the coil 114 produces one voltage pulse per degree of revolution of the crankshaft. The output of the coil 114 is applied to a pulse shaper 116 which produces a train of well defined timing pulses which constitute the timing signal $T_2$. The encoder 110 comprises a toothed wheel 118 and a pick-up coil 120. For an eight cylinder engine; the wheel 118 is driven at the speed of the engine crankshaft. The toothed wheel 118 is provided with four equally spaced teeth with each tooth being located relative to the pick-up coil 120, so that a pulse is produced when the crankshaft angle reaches top dead center immediately before the power stroke for a given cylinder. Thus, the pick-up coil 120 will produce a voltage pulse at the top dead center position of the crankshaft for each piston as it begins its power stroke. The train of voltage pulses produced by the coil 120 is applied to the input of a pulse shaper 122 which produces a train of well defined output pulses which constitute the timing signal $T_1$. As noted above, the timing signal $T_1$ is applied to the clock inputs of the transfer register 86 and storage register 88 so that a new value of the control signal C is entered in the transfer register 86 and a new increment signal I is produced for a given cylinder as the piston reaches top dead center. At this same time the same pulse of the timing signal $T_1$ is applied to the reset input of the down-counter 104 so that the down-count of the timing pulses of signal $T_2$ commences at top dead center so that the output pulse P is produced when the count reaches the value of the spark advance signal SA.

The operation of the inventive control system is as follows. For a given engine, the initial value of spark advance is established by setting of the initializing circuit 98. The initial value of spark advance may be, for example, +20°, i.e. 20° before top dead center. When the engine is started, the initial value of spark advance will be set into the storage register 100 and this value will be applied from the storage register to the adder 96 upon the first pulse of timing signal $T_1$. This will establish the spark advance setting for the start-up of the engine. For explanatory purposes, it will be assumed as a hypothetical operating condition, that the engine is started with the gear selector in park or neutral position and that the engine output torque remains substantially constant for a brief time interval. Under this condition the slip speed of the torque converter will remain constant. This slip speed will be measured by the measuring means 18 as follows. During each clock period of clock signal generator 76, for example a period of 300 milliseconds, the counter 72 will accumulate a count equal to the number of impeller vanes passing the sensor 34 and that cumulative count will be held in the register 74. Similarly, a count will be accumulated in counter 80 equal to the number of turbine vanes passing the sensor 36 and that count will be held in the register 82. The counting will be repeated during each clock period and if the impeller speed changes the speed signal $N_i$ will be changed accordingly and if the turbine speed changes the speed signal $N_t$ will be changed accordingly. The computing means 84 subtracts the turbine speed signal from the impeller speed signal and produces the control signal C, equal to the slip speed. Under the assumed operating conditions, the slip speed will be small, say 20 or 30 rpm. The control signal C is applied to the transfer register 86 and thence to the storage register 88. Upon the occurrence of the first pulse of the timing signal $T_1$ the current value of the control signal is applied to the minuend input of the subtractor 90 and also to the input of the storage register 88. This timing pulse also causes the stored value or old value of the control signal to be applied from the storage register 88 to the subtrahend input of the subtractor 90. In this instance (because of the assumption of constant torque since start-up) the current value of the control signal is equal to the old value of the control signal and hence the subtractor 90 produces an increment signal I equal to zero. The increment signal is applied to the memory address register 92. The value of the increment signal is held in the register 92 and applied to the input of the memory 94. The change of spark advance signal, $\Delta SA$ is zero and is applied to the addend input of the adder 96. Accordingly, the spark advance signal SA is unchanged and remains at the initial value +20°. The spark advance signal SA presets the down-counter 104 at 20°. It should be noted that the chain of events just described occurs substantially instantaneously upon the occurrence of the first pulse of the timing signal $T_1$, i.e. at the instant a given piston reaches top dead center. At the same time the down-counter 104 has been reset by the same pulse of the timing signal $T_1$ and the down-counter 104 commences the counting of pulses in the timing signal $T_2$ starting with the preset count of 360°. When the down-counting of the pulses in the timing signal $T_2$ reaches 20°, the down-counter 104 will produce the output pulse P. This pulse is applied to the electronic ignition circuit 106 and fires the circuit to produce the ignition pulse for the spark plug in the given cylinder. Assuming, as stated above, that the engine output torque remains constant for a brief time after engine start-up, the control system will continue to operate in the manner just described, there being an updating of the spark advance signal SA upon the occurrence of each pulse in the timing signal $T_1$, but the updated signal will have the same value as the previous signal.

The hypothetical operating condition just described is not likely to occur in practice since there will be inevitable system disturbances which will cause the engine output torque to change at least slightly. Further, the vehicle operator will exercise control which will change the engine torque, as by opening the throttle or placing the gear selector in the drive position. When there is a change in engine output torque, the change will be reflected by a change in slip speed of the torque converter. Accordingly, the control signal C will be changed. Assuming, for explanatory purposes, that the value of the control signal C increases. The current value of signal C is continuously applied to the transfer register 86. Upon the occurrence of a timing pulse in the timing signal $T_1$, the current value of the control signal will be compared with the old value of the control signal by the subtractor 90 and the increment signal I will have a positive value with a magnitude equal to the difference. As a result, the memory address register 92 will cause the memory 94 to produce a positive change of spark advance signal, $\Delta SA$. This change of spark advance signal at the addend input of the adder 96 is added to the last value of spark advance which is applied to the augend input of the adder when a pulse signal $T_1$ occurs. Accordingly, the spark advance is incremented in a positive sense and the down-counter 104 is preset to a higher value of spark advance. Accordingly, the down-counter 104 will reach the preset count and fire the spark plug at an increased angle before top dead center. Assuming, again for explanatory purposes, that all other engine operating conditions remain unchanged, the change in spark advance will have an effect upon the engine output torque; it may increase or decrease the torque by a sufficient amount to produce a measurable change in the slip speed of the torque converter. If the engine torque is increased the slip speed will increase and the control signal will likewise increase. This will cause the spark advance signal SA to be incremented by an amount corresponding to the increase of torque. This change of spark advance will again be reflected in the engine output torque. If the output torque increases, the control system will cause the spark advance to be further incremented. This process will continue in the control system until a positive increment of spark advance causes the engine torque to decrease and then the spark advance signal SA will be decremented by an amount corresponding to the change of engine torque. In the hypothetical case where all other operating conditions remain unchanged, the control system will continuously increment and decrement the spark advance value by small amounts so as to maintain a spark advance setting which effectively maximizes the engine output torque. In a practical operating environment for the engine control system, the same kind of operation will take place as described above; however, operating conditions other than spark advance will be continually changing and the control system will superimpose the control of spark advance in such a manner that it is held at a value to maximize the engine output torque for the existing overall operating conditions of the engine.

Although this invention has been described with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. An engine control system for use in an automotive vehicle having an internal combustion engine coupled with vehicle drive wheels through a power train including a fluid coupling, said fluid coupling including an impeller coupled with the engine and a turbine coupled with the drive wheels, said control system comprising measuring means coupled with said fluid coupling for producing an electrical control signal which varies in accordance with slip speed in the fluid coupling, and engine control means connected with said measuring means and with the engine and being responsive to said control signal for changing the value of an engine operating parameter.

2. The invention as defined in claim 1 wherein said measuring means comprises a first transducer means coupled with the impeller for producing a first electrical signal corresponding to the speed of the impeller, a second transducer means coupled with the turbine for producing a second electrical signal corresponding to the speed of the turbine, and including computing means connected with said first and second transducer means for producing said control signal as a predetermined function of the difference between said first and second electrical signals.

3. The invention as defined in claim 2 wherein said engine operating parameter is an operating parameter which influences the value of engine output torque, said control means including detecting means connected with said computing means for producing an increment signal having a magnitude and sign corresponding to a change in said control signal, said control means also including a controller connected with said detecting means and responsive to said increment signal for producing a change in the value of said engine operating parameter according to the sense and magnitude of said increment signal whereby engine output torque is maximized.

4. The invention as defined in claim 3 wherein said engine operating parameter is ignition spark advance, including timing means connected with said engine for producing a timing signal at a predetermined rotative position of said engine, said timing means being connected with said detecting means and with said controller for cyclically updating said increment signal and the ignition spark advance.

5. The invention as defined in claim 2 wherein said fluid coupling comprises a stationary member adjacent the impeller and turbine, said impeller and turbine both having multiple vanes, said first transducer means including a first sensor mounted upon said stationary member adjacent the vanes of said impeller for producing a signal event in response to the passing of each impeller vane, first signal processing means connected with said first sensor for producing a first speed signal comprising a discrete electrical pulse corresponding to each signal event, and wherein said second transducer means comprises a second sensor mounted on said stationary member adjacent the vanes of said turbine for producing a signal event in response to the passing of each turbine vane, and second signal processing means connected with the second sensor for producing a second speed signal comprising a descrete electrical pulse corresponding to each signal event produced by the second sensor.

6. The invention as defined in claim 5 wherein each sensor comprises a sensing element responsive to a change of wave energy induced by motion of the adjacent vane.

7. The invention as defined by claim 6 wherein said sensing element is an electro-acoustical transducer.

8. The invention as defined in claim 5 wherein said fluid coupling is a torque converter having a stationary reaction member, said first sensor being mounted on said reaction member adjacent the edges of the impeller vanes, and said second sensor being mounted on said reaction member adjacent the edges of the turbine vanes.

9. The invention as defined in claim 3 including timing means connected with the engine for producing a timing signal at a predetermined rotative position of the engine and wherein said detecting means comprises storage means for memorizing the value of said control signal upon the occurrence of said timing signal and comparison means connected with the storage means and the computing means for producing said increment signal upon the occurrence of the succeeding timing signal.

10. The invention as defined in claim 3 including timing means connected with the engine for producing a timing signal pulse at a predetermined rotative position of the engine and wherein said computing means produces a digital control signal, said detecting means comprising a transfer register and a storage register and being connected with said timing means, said transfer register being adapted to receive said digital control signal and to transfer it to said storage register upon receipt of one said timing signal pulse, subtracting means having one input connected with the output of the transfer register and another input connected with the output of the storage register and having an output which produces a digital increment signal having a value corresponding to the difference between the current value of the digital control signal and the previous value of the digital control signal.

* * * * *